United States Defensive Publication [19] (H) [11] T990,006

Williams [43] Jan. 1, 1980

[54] NON-WOVEN NETS

[76] Inventor: James A. Williams, P.O. Box 67, Van Wyck, S.C. 29744

[21] Appl. No.: 32,085

[22] Filed: Apr. 23, 1979

Related U.S. Application Data

[63] Continuation of Ser. No. 915,436, Jun. 14, 1978, abandoned.

[51] Int. Cl.[2] ..... B32B 3/10

[52] U.S. Cl. ..... 428/131; 28/106; 428/134; 428/136; 428/137; 428/255; 428/288; 428/290; 428/296; 428/297; 428/373

[57] ABSTRACT

A net which comprises an expanded area-bonded non-woven fabric, and method of preparation. The net has a mesh perimeter in the range ⅛ to 12 inches, tear strength of from 5 to 20 lb. per inch per lb. per square yard of net. The process comprises forming numerous, discontinuous parallel and overlapping slits, having lengths from 1/16 to 6 inches in area-bonded non-woven fabric, and then stretching the slit fabric in a direction transverse to the slits to form a net, and preferably heat treating the net.

8 Claims, 1 Sheet Drawing,

8 Pages Specification

The file of this unexamined application may be inspected and copies thereof may be purchased (849 O.G. 1221, Apr. 9, 1968).

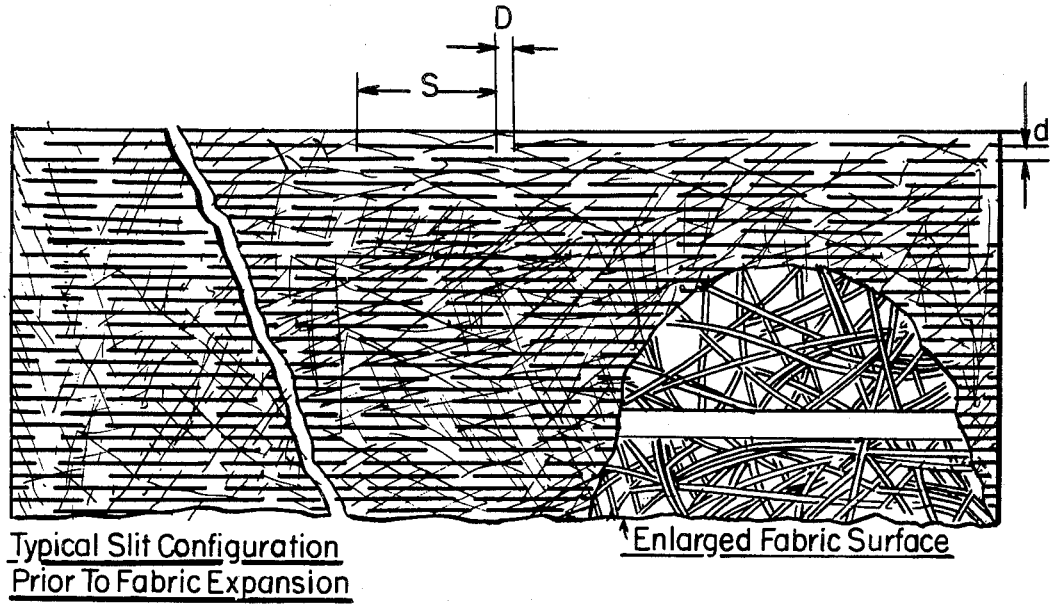

FIG. 1
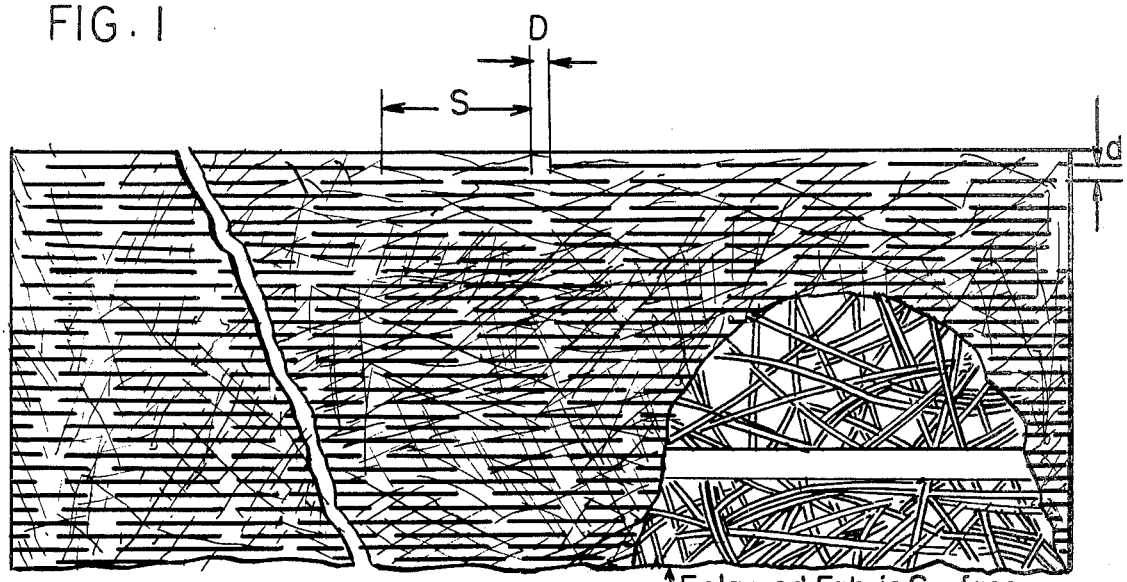
Typical Slit Configuration Prior To Fabric Expansion
Enlarged Fabric Surface
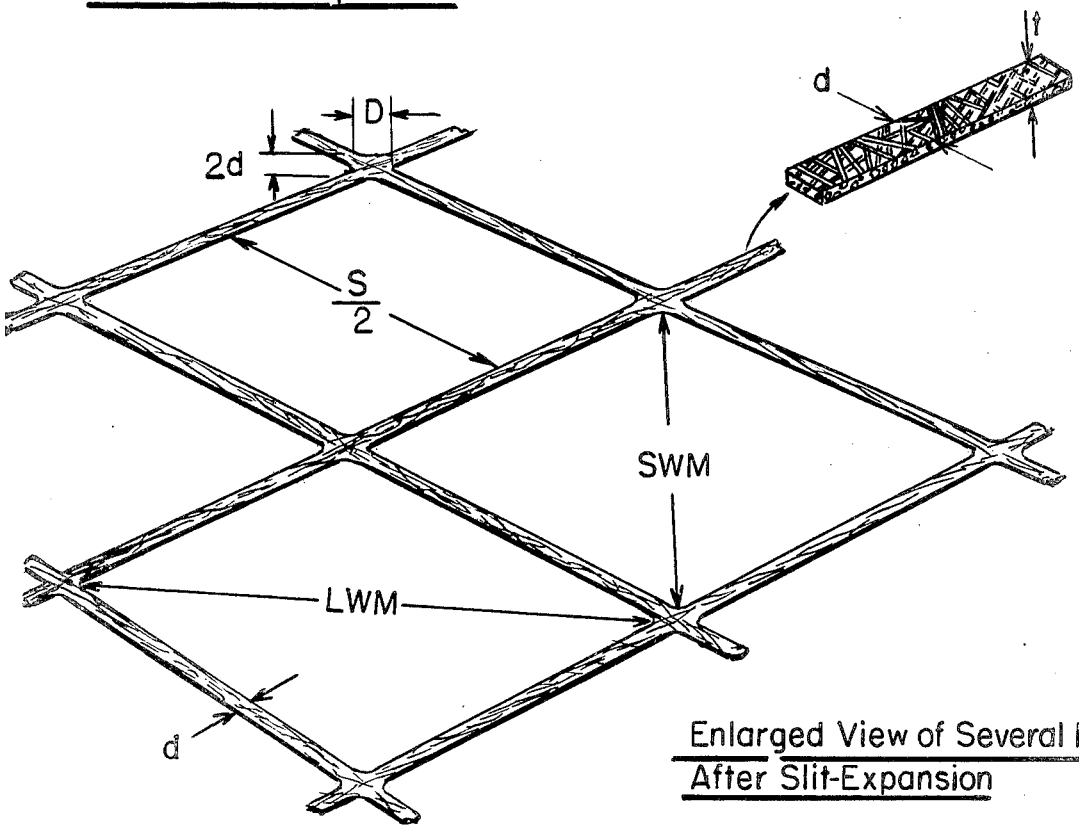
Enlarged View of Several Meshes After Slit-Expansion
FIG. 2